July 31, 1956     L. M. KEIGHLEY     2,756,565
ICE TRAY
Filed Feb. 1, 1954
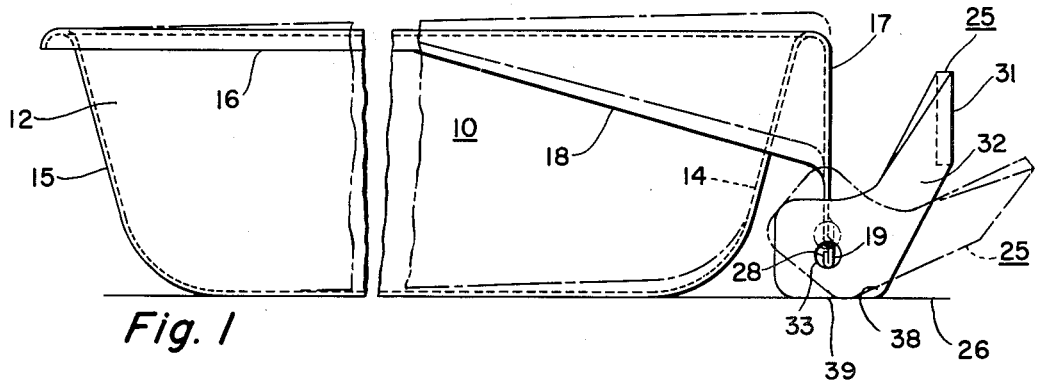
Fig. 1
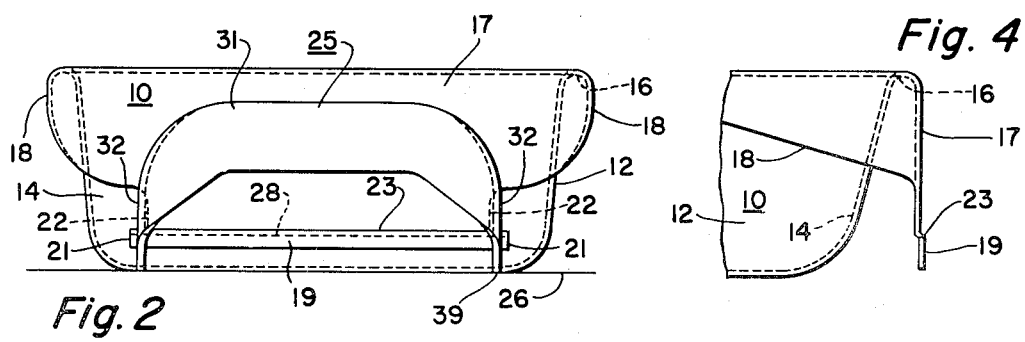
Fig. 2
Fig. 3
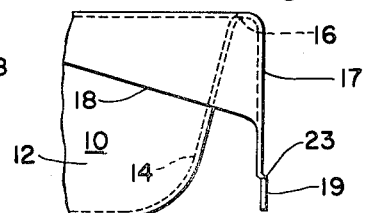
Fig. 4
Fig. 5
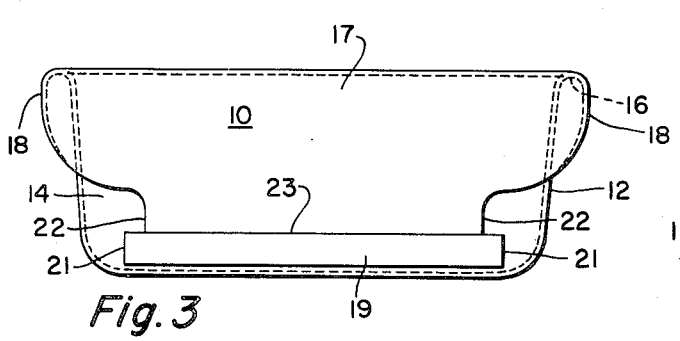
Fig. 6
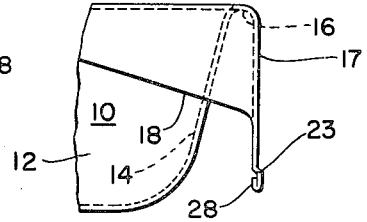
Fig. 7
INVENTOR.
Lloyd M. Keighley
BY R. R. Candor.
His Attorney

United States Patent Office 2,756,565
Patented July 31, 1956

2,756,565

ICE TRAY

Lloyd M. Keighley, Dayton, Ohio, assignor to General Motors Corporation, Detroit, Mich., a corporation of Delaware Application February 1, 1954, Serial No. 407,343

1 Claim. (Cl. 62—108.5)

This invention relates to a freezing device for association with refrigerators and particularly to the mounting of a combined handle and cam on the pan portion thereof.

Freezing devices ordinarily employed in household refrigerators for freezing water into ice blocks usually include a pan or tray having a grid disposed therein. These freezing devices are placed upon a flat support in the freezing compartment of a refrigerator and the pan portion thereof normally becomes ice-bonded to the support while freezing of its contents takes place. Various arrangements of providing a manually actuated cam handle on the pan portion of such a device have been used to break the bond between the pan and its support so that the freezing device may be easily removed therefrom. Most of such arrangements have complicated and increased the manufacturing cost of the pan and have advanced the time required to pivotally assembled a cam handle upon a pan. In some pan structures of this type the mounting means or bracket for attaching a cam handle thereto has been brazed or welded directly to an end wall of a pan and this mars the inner surface of the pan and makes it difficult to provide a continuous unbroken coating of wax or the like thereon. In other structures holes have been cut in a depending extension on the pan and an especially shaped slot has been cut in legs of a handle so that a portion of the legs could be inserted into such holes. Such a slot is expensive to provide and the holes in the pan present points where foreign matter may accumulate and become difficult to be removed or cleaned.

An object of my invention is to provide an improved freezing device for refrigerators wherein the pan portion thereof has a cam handle pivotally mounted thereon in a novel and less expensive manner.

Another object of my invention is to provide a simplified and novel pivotal mounting of a cam handle on a pan of a freezing device whereby to reduce the time required to assemble or attach the handle to the device.

A further object of my invention is to pivotally mount a substantially U-shaped cam handle to lateral projections provided on the lower edge portion of an integral extension on a drawn or stamped sheet metal pan portion of a freezing device for refrigerators whereby the handle may apply a force between a support and the integral extension on the freezing pan to release it from the freezing support on or in a chilling compartment of a refrigerator cabinet.

A still further and more specific object of my invention is to reinforce cam handle mounting projections provided on an integral depending extension of a stamped sheet metal pan of a freezing device formed from rather thin metal in such a manner that the reinforcing affords a somewhat blunt and rounded bearing surface for receiving the force applied to the pan by the handle to thereby prevent damage or deforming the pan extension.

Further objects and advantages of the present invention will be apparent from the following description, reference being had to the accompanying drawings wherein a preferred form of the invention is clearly shown.

In the drawings:

Figure 1 is a broken side view of a freezing device including a pan and a cam handle attached thereto in accordance with my invention;

Figure 2 is an end elevation of the freezing pan shown in Figure 1 on a reduced scale;

Figure 3 is an end view of the pan of the freezing device showing laterally extending projections formed on the lower edge of an integral depending extension on the pan;

Figure 4 is a fragmentary side view of the end portion of the pan disclosed in Figure 3 prior to crimping a part of the lower edge of its integral extension;

Figure 5 is a view similar to Figure 4 showing the lower edge of the integral pan extension crimped over upon itself;

Figure 6 is an end elevation of the pan illustrated in Figure 5 showing the crimped over reinforced spaced apart handle mounting projections thereon; and Figure 7 is a plan view of the cam handle shown on the pan in Figures 1 and 2.

Referring to the drawings, the freezing device of the present invention shown in Figure 1 thereof includes a tray which is a one piece stamped, pressed or drawn elongated metal pan 10 of thin sheet aluminum alloy having a flat bottom wall, outwardly inclined or flared side walls 12 and inclined end walls 14 and 15. Such a pan is adapted to have a grid disposed therein and this pan or tray together with the grid forms a freezing device adapted to contain water or other substances to be frozen. Also the aluminum pan of such a freezing device is usually anodized and waxed, in a manner well known to those skilled in the art, to facilitate removal of frozen contents therefrom. In drawing, pressing or stamping the pan 10 sufficient material is provided about the edges of the metal sheet to permit the rolling over of a top rim 16 thereon, an integral extension 17 projecting and depending from the end wall 14 thereof or from rim 16 at this end wall and integral reinforcing side aprons 18. The rim 16, extension 17 and aprons 18 increase the structural strength of pan 10 and serve to prevent warpage and distortion thereof. Integral extension 17 continues from the one end wall 14 of pan 10 and includes a main upper portion depending from the top thereof in spaced relation thereto. Extension 17 also includes a lower edge portion 19 provided with lateral projections 21 extending outwardly beyond a cut away part 22 of the main depending portion of the integral extension immediately adjacent the lower edge portion 19 (see Figure 3). The horizontally elongated lower edge portion 19 of pan 10 is creased or scored, as indicated at 23 (see Figures 3 and 4) for a purpose to be presently described. The projections 21 on the lower edge portion 19 of extension 17 provides a mounting, beyond the tray or pan walls, for a lever means in the form of a cam handle member, generally represented by the reference character 25. Handle member 25 is substantially U-shaped in configuration (see Figure 7) with the legs of the U normally spaced angularly outwardly of one another. Cam handle 25 is pivotally mounted upon pan 10 in a manner to be hereinafter described. The line indicated by the numeral 26 in Figures 1 and 2 is representative of a flat refrigerated shelf surface, in or on an evaporator of a refrigerating system or a flat support of a freezing compartment of a refrigerator cabinet, upon which the pan 10 is set and to which the pan becomes frozen-bonded. It is to be noted that the lower edge of the integral extension 17 of pan 10, depending downwardly along and spaced from the one end wall 14 thereof, terminates at a point above the pan bottom wall 11. Due to the thinness of the metal of extension 17 that portion 19 thereof, adjacent its lower edge, is preferably, although not necessarily, crimped or folded back upon itself as at 28 (see Figures 5 and 6) to reinforce the lower edge portion 19 of extension 17 and to provide a rounded bearing surface about the bottom of projections 21 adapted to be engaged by the cam or lever handle 25 for a purpose as will be hereinafter described.

The bight portion of U-shaped cam lever 25 forms a handle 31 therefore and the end of the legs 32 thereof each has a round hole 33 punched or pierced therein. The holes 33 provide a seat for engaging the rounded bearing surface on the lower edge of projections 21 (see Figure 1). A portion of lever 25, intermediate handle part 31 thereof and the end of its legs 32, is provided with a curved cam 38. A flat straight part or bottom edge 39 extends from the cam 38 to the end of legs 32. These flat parts or lower edges 39 on the legs of handle 25 are level with or are horizontally aligned with the bottom wall of pan 10 and rest on or engage support 26 to normally hold the cam handle in an upright operative position (see Figures 1 and 2). In Figure 7 of the drawings the handle 25 is shown with its legs 32 spread apart and these legs are adapted to be bent into substantially parallel relation with one another as indicated by the dot-dash lines 41 when assembling the handle to the tray.

In order to assemble U-shaped handle 25 upon pan 10 the handle with its spaced apart legs 32 are placed over the horizontal elongated folded over edge portion 19 of the integral pan extension 17 and the holes 33 in the ends of the handle legs are aligned with the double walled projections 21. The legs 32 of handle 25 are then bent toward one another, as indicated by the dot-dash lines 41 in Figure 7, to cause the lateral projections 21 to pass into or through the round holes 33 in the ends of the handle legs 32. This locks U-shaped handle 25 on pan 10 against removal therefrom and mounts the same upon the projections 21, at the lower edge portion 19 of the integral extension 17 on the pan, for pivotal movement relative thereto (see Figures 1 and 2). When the assembled device is placed upon a freezing support, indicated by line 26, handle 25 is held in an upright position by the lower flat straight portion 39 on the legs thereof. The wall of hole 33 in the legs 32 of the handle 25 is adapted to engage the rounded bottom bearing portion of the integral lateral projections 21.

In actuating or operating the lever means or handle member 25, after the contents of tray or pan 10 has been frozen, its handle part 31 is grasped and pulled forwardly relative to the pan 10. This pulling force applied to member 25 causes the same to swing downwardly about its pivotal mounting, projections 21 and holes 33, and the curved cam portions 38 thereon pivot upon support 26 to transmit this force between the support and the lower portion of the integral depending extension 17 on pan 10 by way of the projections 21. The cam portions 38 on legs 32 of handle 25 thereby elevates the end 14 of pan 10 relative to support 26, as shown by the dot-dash lines in Figures 1 of the drawings, to thus break the frozen or ice-bond between the support and the pan to permit pan 10 and its frozen contents to be readily slid off and removed from its support. The brunt of the force applied to cam handle 25 is taken by the reinforced rounded bearing surface on the bottom of the projections 21, afforded by bending the bottom edge portion 19 back upon itself as described. Force applied to handle 25 is therefore prevented from tearing or deforming the lower edge of extension 17 or of bending the double walled mounting projections 21. The bending back of the lower portion of extension 17, as at 28, in addition to reinforceing the lower part of the main portion of the integral extension 17 also gets rid of a sharp edge at the lower front part of pan 10.

From the foregoing it should be apparent that I have provided a freezing device for refrigerators having a cam or lever handle pivotally mounted thereon in an improved, low cost and simplified manner. By locating the double walled laterally extending projections on an integral part of an integral depending extension of the freezing tray or pan the inner surface of walls of the pan is not marred or obstructed and will not therefore interfere with the application of a continuous unbroken film or coating of wax or the like thereto. The novel method of pivotally mounting a handle upon the pan as herein disclosed eliminates the placing of a heavy reinforcing handle mounting metal piece or bar on the pan and also eliminates screws usually employed to rigidly secure such a piece or bar to the pan. The provision of mounting a handle on a pan with only round holes in legs of the handle eliminates the necessity of cutting specially shaped slots in the end of legs thereof and renders the handle quickly attachable to the pan.

While the form of embodiment of the invention as herein disclosed constitutes a preferred form, it is to be understood that other forms might be adopted as may come within the scope of the claim which follows.

What is claimed is as follows:

An ice tray for containing a liquid to be frozen and adapted to be disposed upon a support of a freezing compartment of a refrigerator comprising, a stamped sheet metal pan having upstanding impervious side and end walls, a formed over top rim, an extension integral therewith and depending from one of said end walls, said integral extension including a main portion spaced from said one end wall of the pan and a lower edge portion, said lower edge portion of said integral extension being widened laterally with respect to the main portion thereof to provide opposed projections at said lower edge portion, said widened lower edge portion of said integral extension being crimped back upon itself to provide a double wall thickness therealong for reinforcing said projections and forming a substantially rounded bearing surface at the bottom thereof, a substantially U-shaped handle on said pan having flat legs disposed perpendicular to said support, each end of the flat legs of said U-shaped handle having means adapted to receive the opposite lateral projections on the integral extension of said pan, the legs of said handle being bent toward one another over said opposed projections to cause said means to pivotally mount said handle thereon, at least one of the legs of said handle having a cam-like portion thereon adapted to rest upon the support for normally holding the bight portion of said handle intermediate legs thereof in an upright position spaced above said support, and said handle being movable about its pivotal mounting to cause said cam-like portion thereof to apply a force between said support and said rounded bearing surface on the projections of said integral extension of the pan for elevating the handle end of said tray relative to the support.

References Cited in the file of this patent

UNITED STATES PATENTS

| 1,317,420 | Berry | Sept. 30, 1919 |
| 2,216,592 | Jacobs | Oct. 1, 1940 |
| 2,228,928 | Reeves | Jan. 14, 1941 |

FOREIGN PATENTS

| 262,931 | Great Britain | 1926 |
| 287,278 | Great Britain | 1927 |